Figure 2:
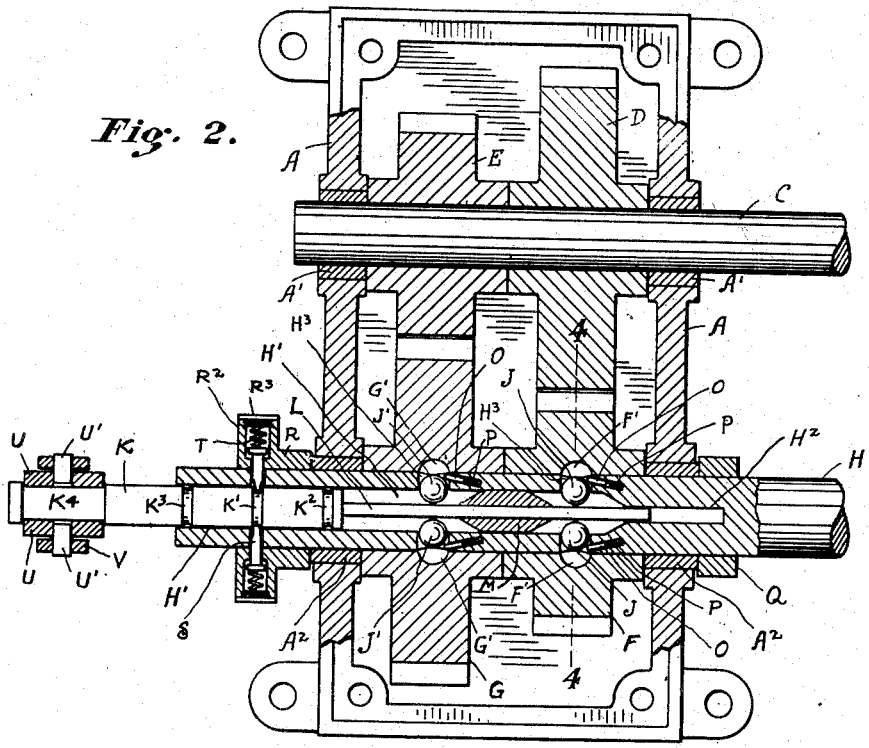

I. S. WHISLER.
CLUTCH DEVICE.
APPLICATION FILED JULY 28, 1911.
1,015,254.
Patented Jan. 16, 1912.
2 SHEETS—SHEET 1.
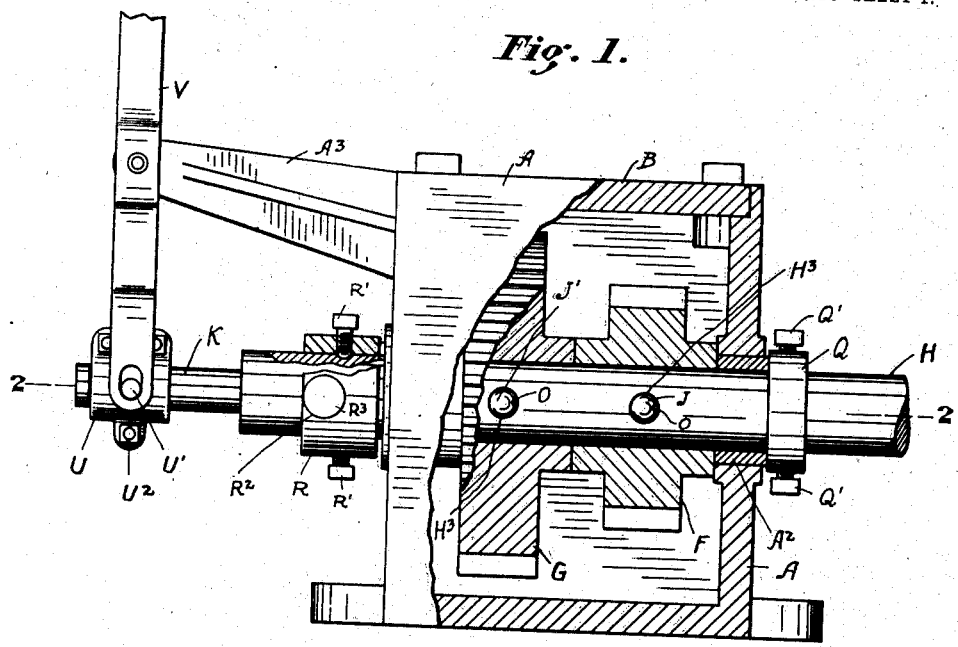
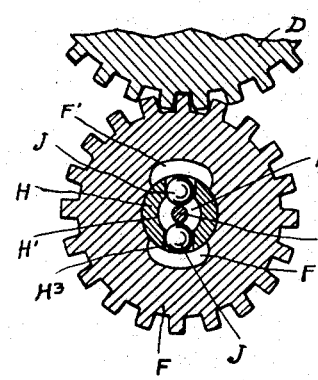
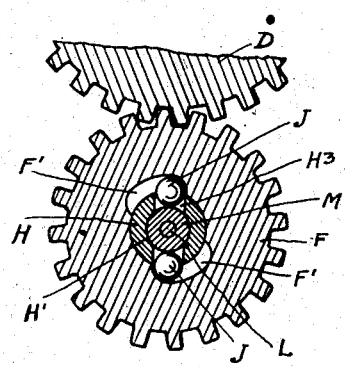
WITNESSES:
INVENTOR
ISMA S. WHISLER.
BY
ATTORNEY

I. S. WHISLER.
CLUTCH DEVICE.
APPLICATION FILED JULY 28, 1911.

1,015,254.

Patented Jan. 16, 1912.
2 SHEETS—SHEET 2.

WITNESSES:
Charles E. Hinkley
James G. Mendenhall

INVENTOR
ISMA S. WHISLER,
BY
Thomas L. Ryan
ATTORNEY

ISMA S. WHISLER, OF NEWCASTLE, INDIANA, ASSIGNOR OF ONE-HALF TO LEONARD DANIEL, OF NEWCASTLE, INDIANA.

CLUTCH DEVICE.

1,015,254.

Specification of Letters Patent.

Patented Jan. 16, 1912.

Application filed July 28, 1911. Serial No. 641,093.

*To all whom it may concern:*

Be it known that I, the undersigned ISMA S. WHISLER, a citizen of the United States, residing at Newcastle, in the county of Henry and State of Indiana, have invented certain new and useful Improvements in Clutch Devices, of which the following is a specification.

This invention relates to improvements in clutch devices.

The objects of the invention are to provide means of this class that will be especially useful in transmission gearing whereby the operation of the driven shaft may be controlled in an improved manner; specific purposes being to overcome the necessity in transmission gearing of the use of friction wheels, rings and the like and of sliding or shifting gear wheels; and to provide a device of the kind described that will be compact, reliable and durable, and economical of manufacture.

The objects of the invention are accomplished by the mechanism described in this specification and illustrated in the accompanying drawings, and the invention is defined by the appended claims.

In the drawings the several parts of the invention are identified by similar characters of reference throughout the different views, in which—

Figure 3:
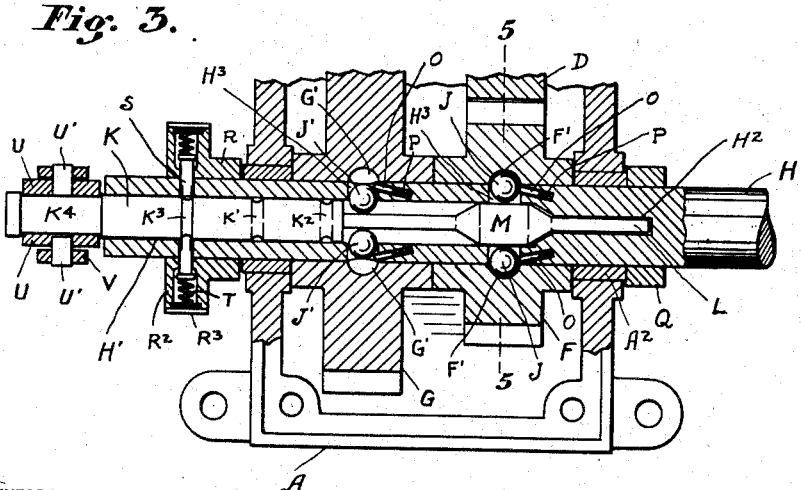

Figure 1 is an end view of my improved transmission gearing, in which my invention is shown, a portion of the casement being broken away. Fig. 2 is a sectional plan view taken on the line 2—2 in Fig. 1. Fig. 3 is a view of the invention, as shown in Fig. 2 several parts however being in shifted position. Fig. 4 is a vertical sectional view taken on the line 4—4 in Fig. 2. Fig. 5 is a vertical sectional view taken on the line 5—5 in Fig. 3, in the latter view the gear wheel being shown in shifted position.

In this specification of my invention, a gearing is shown wherein two speeds of the driven shaft may be had. A casement A of the simple and compact construction shown, may be used and is provided with a suitable cap plate B. Secured to the usual driving shaft C which is journaled in the bearings $A^1$ are the gear wheels D and E. Gear wheels F and G corresponding to and adapted to mesh with the gear wheels D and E respectively, are carried loosely on the driven shaft H and are held against longitudinal movement thereon by the walls of the casement. In the bore of the gear wheel F and of the gear wheel G are the similar concentric grooves or recesses $F^1$ and $G^1$ semi-circular in cross section.

$H^1$ designates a central bore in the driven shaft and which bore is terminated in the form of the bore $H^2$ of smaller diameter. In radial apertures or openings $H^3$ which extend from the bore $H^1$ and through the walls of the driven shaft are disposed loosely the similar steel balls designated as J and $J^1$. The longitudinal distance between the centers of these apertures $H^3$ is the same as the longitudinal distance, center to center, between the grooves $F^1$ and $G^1$.

K designates a plunger disposed slidingly in the bore $H^1$. A stem L secured to this plunger has its center coincident with the axial center of the driven shaft and its end will rest slidingly in the bore $H^2$. Secured to the stem at a proper location is a projector head M. This projector head is of a diameter to fit slidingly in the bore $H^1$ its ends being tapered down to the diameter of the stem L. From each of the openings $H^3$ and at a point near the periphery of the driven shaft H leads a small bore in which is disposed slidingly, a click or detent O. Small helical springs P contained in the said bores serve to press these clicks outwardly and against the steel balls whereby the latter though free to move outwardly by force operated from within the bore $H^1$ are held normally retracted to the positions as shown in Fig. 2, against the stem L and just inside of the periphery of the driven shaft H.

Q and R designate collars secured by set screws $Q^1$ and $R^1$ to the driven shaft to prevent longitudinal movement thereof in its bearings $A^2$. Each of the bosses $R^2$ formed integral with the collar R is provided with a bore which registers with a hole in the wall of the shaft H. In the guideway thus formed is slidingly disposed the detent S its inner end being rounded in form to fit in one of the three similar peripheral grooves marked $K^1$, $K^2$ and $K^3$ of the plunger. These detents are held in engagement with the said groove by the springs T which are retained in said bosses $R^2$ by the caps $R^3$.

The length of the stem L between the plunger K and the center of the projector head M is such that when the central groove $K^1$ is engaged by the detents the projector head M is equidistant between the pairs of balls and at the neutral position; the gear wheels F and G being free to rotate on the driven shaft. The plunger K is yieldably held against longitudinal movement in the bore $H^1$ by the detents S. Retained loosely but held against longitudinal movement on the outer end of the plunger K is a sleeve to which shifting means may be connected. This sleeve is composed of matched half-rings U having the studs $U^1$ and being secured together by bolts $U^2$, and resting loosely on the neck $K^4$ of the plunger. An arm $A^3$ formed integral with the casement A affords a support upon which a hand lever V is pivotally supported and whose lower and forked end engages the studs $U^1$ on the said sleeve.

With the several parts of the device at the relative positions as shown in Fig. 2, the balls J and $J^1$ being held at retracted position; the gear wheels F and G will be driven idly on the shaft H. The plunger K is retained at normal neutral position by the detents S. To operate the shaft H at the higher speed the plunger is moved forwardly to where the detents S engage the groove $K^3$. As shown in Fig. 3 the projector head will have passed between and moved the balls J radially and into occupancy of the grooves $F^1$. There being thus an abutting contact between the balls and the ends of the grooves $F^1$ established, as shown in Figs. 3 and 5, the motion of the wheel F is imparted to the shaft H. With a returning of the plunger to the neutral position there being no support for the balls they are moved back by the ends of the grooves $F^1$ to retracted position and are there held against displacement by the spring pressed clicks O. To operate the shaft H at the lower speed the plunger is shifted rearwardly to where the detents S engage the groove $K^2$. The projector head M will have passed between and protruded the balls $J^1$ into occupancy of the grooves $G^1$ in the bore of the wheel G, the result being that motion is imparted to the shaft H in the manner hereinbefore described.

By virtue of my present invention a self contained compact and closely built transmission gearing is afforded wherein the driven shaft may be easily rendered operative or inoperative. The number of parts is reduced to a minimum and they are so constructed, combined and arranged as to mutually brace each other. The device is rugged and durable, not liable to get out of order or repair and is capable of being easily applied to use.

I am aware that minor changes might be made in the general construction and detailing of the parts intended to carry out the purposes of my invention, within the scope defined by the appended claims, without departing from the nature of the invention or sacrificing any of its advantages.

What I claim as my invention, and desire to secure by Letters Patent, is—

1. In a clutch device, the combination of a shaft, a wheel mounted loosely on said shaft, a bore in said shaft, a recess in the bore of the wheel, an opening leading from the bore of the shaft and to register with said recess, a plunger disposed slidingly in the bore of the shaft, a stem in said plunger, a projector head on said stem, a ball in said opening, means to yieldingly retain the ball at retracted position.

2. In a clutch device, the combination of a shaft, a wheel mounted loosely on said shaft, a bore in said shaft, a recess in the bore of the wheel, an opening leading from the bore of the shaft and to register with said recess, a plunger disposed slidingly in the bore of the shaft, a stem in said plunger, a ball in said opening, a projector head on said stem which when moved longitudinally will protrude the ball from the opening, means to yieldably retain the ball at retracted position, and means supported by the shaft to yieldably hold the plunger against longitudinal movement.

3. In a clutch device, a shaft, a wheel mounted loosely thereon, a bore in the shaft, a recess in the bore of the wheel, an opening leading from the bore of the shaft and to register with the said recess, a plunger movable slidingly in the bore of the shaft, a stem in the plunger, a ball in the said opening, and means to yieldably retain the ball in the opening and against the stem.

4. In a clutch device, the combination of a shaft, a wheel mounted loosely thereon, a bore in the shaft, a recess in the bore of the wheel, an opening leading from the bore of the shaft and to register with the said recess, a ball in said opening, means to yieldably retain the ball against escapement from the said opening, and means operable in the bore of the shaft to protrude the ball and retain it at engagement with the recess in the bore of the wheel.

In testimony whereof I affix my signature in presence of two witnesses.

ISMA S. WHISLER.

Witnesses:
  LEONARD A. DANIEL,
  THOMAS L. RYAN.